(12) United States Patent
Kanzaki et al.

(10) Patent No.: US 12,436,678 B2
(45) Date of Patent: Oct. 7, 2025

(54) DATA DISTRIBUTION DEVICE

(71) Applicant: DENSO CORPORATION, Kariya (JP)

(72) Inventors: Takemasa Kanzaki, Kariya (JP); Nobuyuki Kondoh, Kariya (JP); Takeshi Sugashima, Kariya (JP)

(73) Assignee: DENDO CORPORATION, Kariya (JP)

( * ) Notice: Subject to any disclaimer, the term of this patent is extended or adjusted under 35 U.S.C. 154(b) by 2 days.

(21) Appl. No.: 18/635,620

(22) Filed: Apr. 15, 2024

(65) Prior Publication Data

US 2024/0385748 A1    Nov. 21, 2024

(30) Foreign Application Priority Data

May 19, 2023   (JP) .................................. 2023-083040

(51) Int. Cl.
*G06F 3/06*         (2006.01)
(52) U.S. Cl.
CPC .......... *G06F 3/0604* (2013.01); *G06F 3/0644* (2013.01); *G06F 3/067* (2013.01)
(58) Field of Classification Search
CPC ....... G06F 3/0604; G06F 3/0644; G06F 3/067
See application file for complete search history.

(56) References Cited

U.S. PATENT DOCUMENTS

| 9,342,574 B2 * | 5/2016 | Kan .................... G06F 3/0617 |
| 2016/0006839 A1 * | 1/2016 | Sawazaki ............... H04L 67/10 |
| | | 709/203 |

FOREIGN PATENT DOCUMENTS

JP         2011-181082 A        9/2011

* cited by examiner

*Primary Examiner* — Tim T Vo
*Assistant Examiner* — Richard B Franklin
(74) *Attorney, Agent, or Firm* — Posz Law Group, PLC

(57) ABSTRACT

A data distribution device includes: a data storage storing a distribution destination setting table defining a correspondence relationship between (i) identification information combination including output source hardware identification information indicating output source of acquired data and data identification information indicating a type of acquired data and (ii) distribution destination hardware identification information indicating a distribution destination hardware device of acquired data; a distribution destination determination circuit determining the distribution destination of acquired data based on (i) the combination of the output source hardware identification information and the data identification information, which are included in the acquired data and (ii) the distribution destination setting table; a data distribution circuit outputting the acquired data to the determined distribution destination hardware device. The distribution destination determination circuit and the data distribution circuit are implemented by digital circuits that include multiple logic circuits.

8 Claims, 4 Drawing Sheets

DATA DISTRIBUTION DEVICE

CROSS REFERENCE TO RELATED APPLICATION

The present application claims the benefit of priority from Japanese Patent Application No. 2023-083040 filed on May 19, 2023. The entire disclosure of the above application is incorporated herein by reference.

TECHNICAL FIELD

The present disclosure relates to a data distribution device that distributes data.

BACKGROUND

In a known data distribution device, the device distributes received image data to multiple output units by giving a higher priority to an output unit having a higher print speed.

SUMMARY

A data distribution device includes: a data storage storing a distribution destination setting table defining a correspondence relationship between (i) identification information combination including output source hardware identification information indicating output source of acquired data and data identification information indicating a type of acquired data and (ii) distribution destination hardware identification information indicating a distribution destination hardware device of acquired data; a distribution destination determination circuit determining the distribution destination of acquired data based on (i) the combination of the output source hardware identification information and the data identification information, which are included in the acquired data and (ii) the distribution destination setting table; a data distribution circuit outputting the acquired data to the determined distribution destination hardware device. The distribution destination determination circuit and the data distribution circuit are implemented by digital circuits that include multiple logic circuits.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
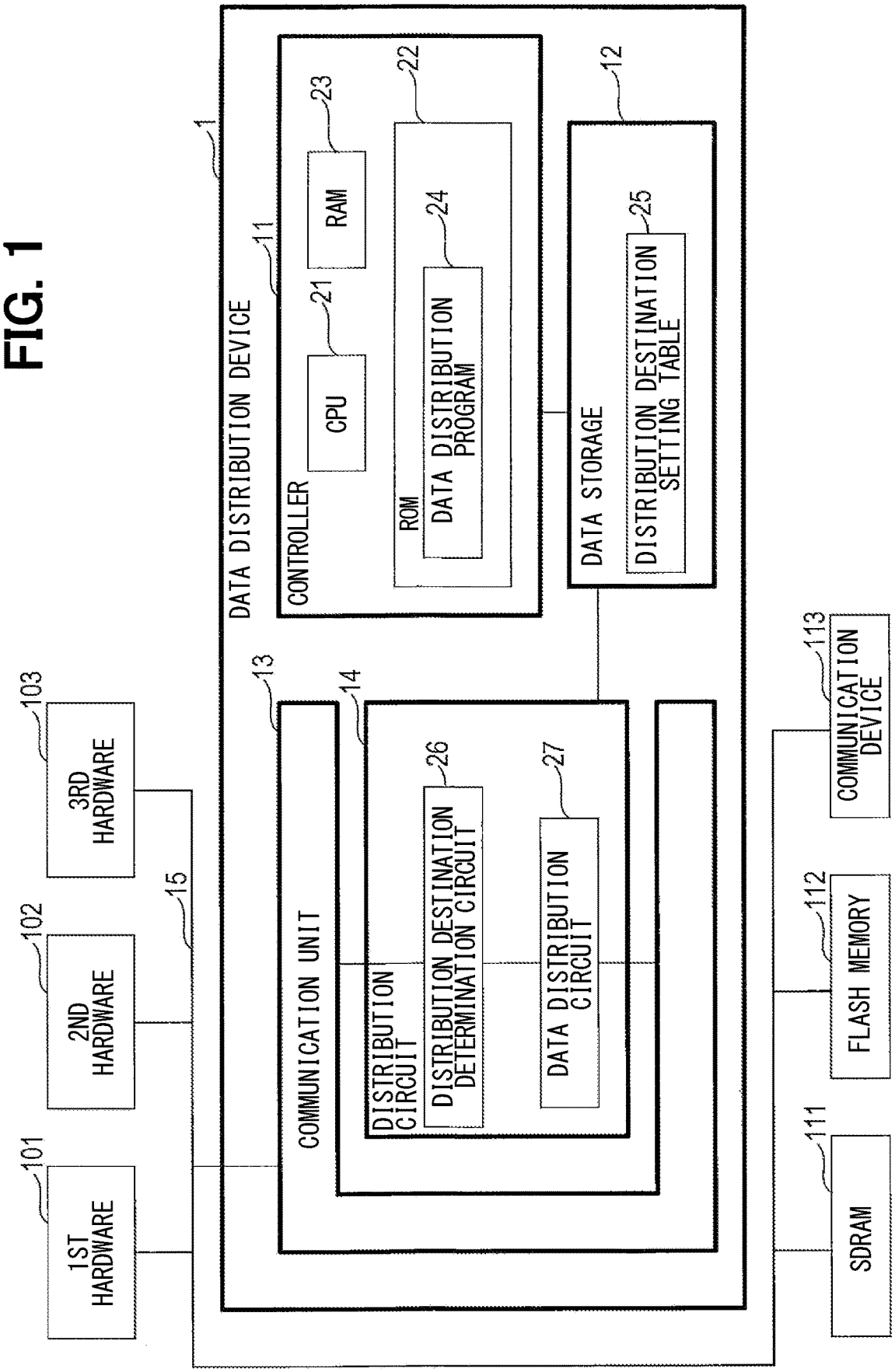
FIG. 1 is a block diagram showing a configuration of a data distribution device.

In a case where software (hereinafter, referred to as existing software) already installed in a target device does not have a data acquisition function for acquiring data to be used when installing new software to the target device, it is necessary to add the data acquisition function to the existing software.

After performing detailed study, the inventors of the present disclosure found that when the data acquisition function is added to the existing software in software manner, that is, as software program, a processing speed of the existing software decreases or a malfunction occurs due to a change made in the existing software.

According to an aspect of the present disclosure, a data distribution device includes a data storage, a distribution destination determination circuit, and a data distribution circuit. The distribution destination determination circuit and the data distribution circuit are implemented by digital circuits that include multiple logic circuits. The data storage stores a distribution destination setting table that defines a correspondence relationship between (i) an identification information combination and (ii) distribution destination hardware identification information. The identification information combination is a combination of output source hardware identification information, which indicates a hardware device corresponding to an output source of acquired data piece, and data identification information, which indicates a type of the acquired data piece. The distribution destination hardware identification information indicates a hardware device corresponding to a distribution destination of the acquired data piece. The distribution destination determination circuit determines the distribution destination of the acquired data piece based on (i) the combination of the output source hardware identification information and the data identification information, which are included in the acquired data piece, and (ii) the distribution destination setting table. The data distribution circuit outputs the acquired data piece to a distribution destination hardware device, which is a hardware device corresponding to the distribution destination determined by the distribution destination determination circuit.

The data distribution device having the above-described configuration can distribute data without using software program. That is, the data distribution device according to the present disclosure distributes data by using the distribution destination determination circuit and the data distribution circuit, which are implemented by digital circuits including multiple logic circuits. In the data distribution device according to the present disclosure, the distribution destination determination circuit and the data distribution circuit are provided with the data acquisition function that acquires data to be used in installation of new software. Thus, it is possible to suppress decrease in the processing speed of the existing software and occurrence of malfunction due to a change made in the existing software.

The following will describe embodiments of the present disclosure with reference to the drawings. As illustrated in FIG. 1, the data distribution device 1 of the present embodiment includes a controller 11, a data storage 12, a communication unit 13, and a distribution circuit 14.

The controller 11 is an electronic control unit mainly configured by a microcomputer. The microcomputer includes a CPU 21, a ROM 22, and a RAM 23. Various functions of the microcomputer are implemented by the CPU 21 executing a program stored in a non-transitory tangible storage medium. In one example, the ROM 22 corresponds to the non-transitory tangible storage medium storing the program. By executing the program, a method corresponding to the program is executed. Partial or all of the functions executed by the CPU 21 may be implemented by hardware circuit, such as one or more ICs. The number of microcomputers constituting the controller 11 may be one or more.

The ROM 22 is a rewritable non-volatile memory and stores a data distribution program 24 to be described later. The data distribution program 24 may be installed in the data distribution device 1 in advance. The data distribution program 24 may be installed in the data distribution device via a storage medium or a network. The data distribution program 24 is stored in a storage area that can be managed independently of other programs for implementing other functions. Thus, even when the data distribution program 24 is being updated, other programs are not affected by the update.

The data storage 12 is a storage device for storing various data. The data storage 12 stores a distribution destination setting table 25 to be described later.

The communication unit 13 transmits and receives data to and from a device connected to a bus 15 in accordance with a preset communication protocol (for example, a CAN communication protocol). CAN is an abbreviation for controller area network. CAN is a registered trademark.

For example, a first hardware 101, a second hardware 102, and a third hardware 103 are connected to the bus 15. For example, an SDRAM 111, a flash memory 112, and a communication device 113 are connected to the bus 15. SDRAM is an abbreviation for synchronous dynamic random access memory. The communication device 113 is a device that performs data communication via Ethernet. Ethernet is a registered trademark.

The distribution circuit 14 is a digital circuit configured by a large number of logic circuits. The distribution circuit 14 includes a distribution destination determination circuit 26 and a data distribution circuit 27, which are implemented by the digital circuit including multiple logic circuits.

Figure 2:
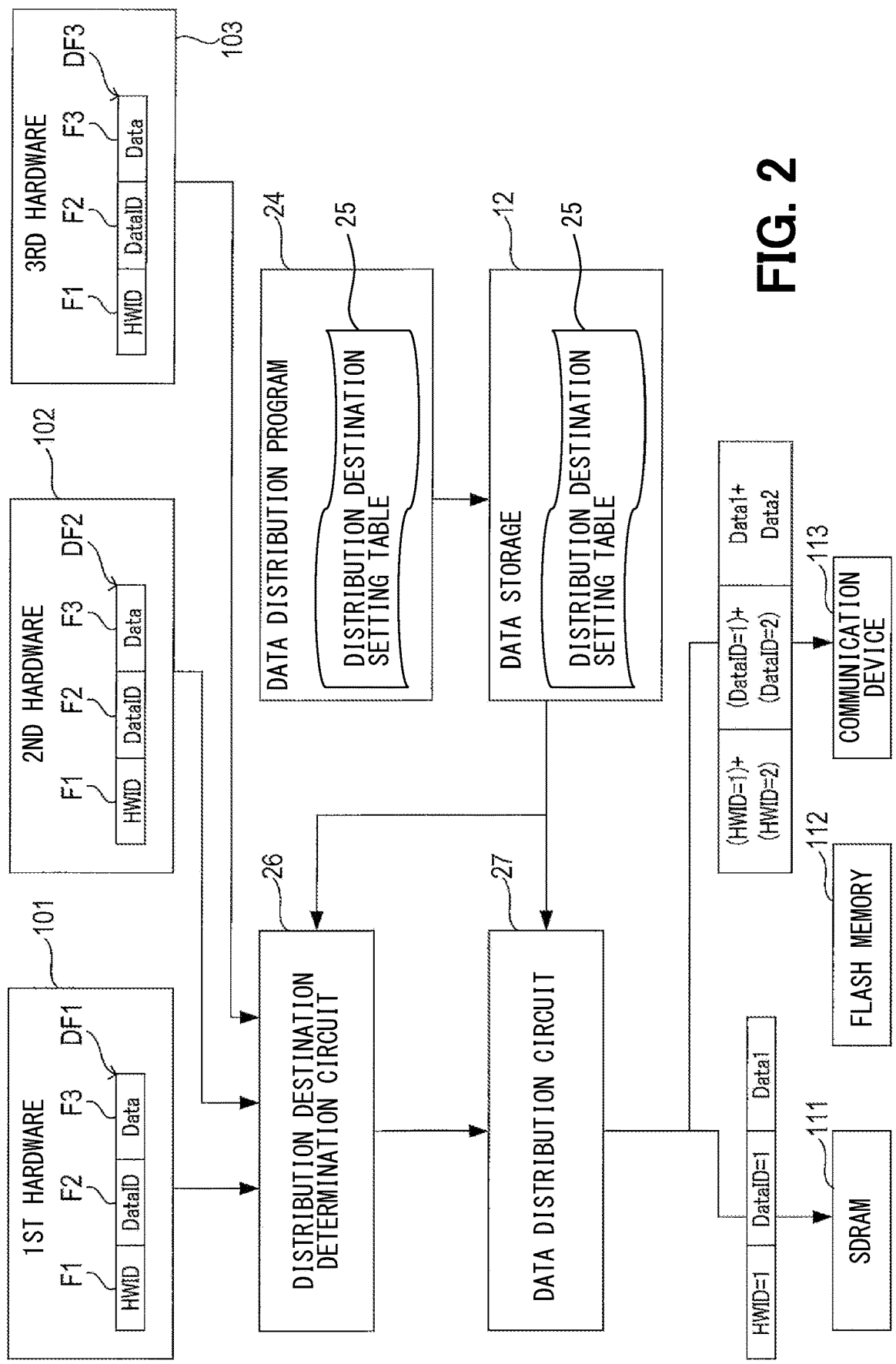
FIG. 2 is a functional block diagram showing a functional configuration of the data distribution device.

As shown in FIG. 2, the first hardware 101, the second hardware 102, and the third hardware 103 are configured to execute predetermined processes different from one another. The first hardware 101, the second hardware 102, and the third hardware 103 output a first data frame DF1, a second data frame DF2, and a third data frame DF3, respectively.

Each of the first, second, and third data frames DF1, DF2, DF3 is generated by adding output source hardware identification information (hereinafter referred to as output source hardware ID) and data identification information (hereinafter referred to as data ID) to data generated by the corresponding hardware 101, 102, 103. The output source hardware ID is identification information indicating hardware of output source that outputs the data frame. The data ID is identification information indicating a data type of the generated data.

Each of the first, second, and third data frames DF1, DF2, DF3 include a hardware ID field F1, a data ID field F2, and a data field F3. The hardware ID field F1 stores an output source hardware ID. The data ID field F2 stores a data ID.

The data field F3 of the first data frame DF1 stores data generated by the first hardware 101. The data field F3 of the second data frame DF2 stores data generated by the second hardware 102. The data field F3 of the third data frame DF3 stores data generated by the third hardware 103.

The data distribution program 24 includes a distribution destination setting table 25. The data distribution program 24 is executed by the CPU 21 in response to power-on of the data distribution device 1 and activation of the controller 11. The CPU 21 stores the distribution destination setting table 25, which is included in the data distribution program 24, in the data storage 12 by executing the data distribution program 24.

The distribution destination setting table 25 includes information in which a correspondence relationship among at least one output source hardware ID, at least one data ID, and at least one distribution destination hardware identification information (hereinafter referred to as distribution destination hardware ID) is set.

The distribution destination setting table 25 may include information in which a correspondence relationship among one output source hardware ID, one data ID, and one distribution destination hardware ID is set.

The distribution destination setting table 25 may include information in which a correspondence relationship among multiple output source hardware IDs, multiple data IDs, and one distribution destination hardware ID is set.

The distribution destination setting table 25 may include information in which a correspondence relationship among one output source hardware ID, one data ID, and multiple distribution destination hardware IDs is set.

The distribution destination setting table 25 may include information in which a correspondence relationship among multiple output source hardware IDs, multiple data IDs, and multiple distribution destination hardware IDs is set.

The following will describe a specific example of the distribution destination setting table 25.

The output source hardware ID is denoted as OUT_HWID. The data ID is denoted as DataID. A combination (hereinafter referred to as ID combination) of the output source hardware ID and the data ID is denoted as (OUT_HWID, DataID).

The distribution destination hardware ID is denoted as DIS_HWID. The correspondence relationship among the output source hardware ID and the data ID and the distribution destination hardware ID is expressed as (OUT_HWID, DataID)→DIS_HWID.

The output source hardware ID of the first hardware 101 is set to "1". The output source hardware ID of the second hardware 102 is set to "2". The output source hardware ID of the third hardware 103 is set to "3".

The data ID of the data output from the first hardware 101 is set to "1" or "2". The data ID of the data output from the second hardware 102 is set to one of "1", "2", or "3".

The data ID of the data output from the third hardware 103 is set to one of "1", "2", "3", or "4".

The distribution destination hardware ID of the SDRAM 111 is set to "1". The distribution destination hardware ID of the flash memory 112 is set to "2". The distribution destination hardware ID of the communication device 113 is set to "3".

In the first data frame DF1, the ID combination of the output source hardware ID and the data ID includes (1,1) and (1,2). In the second data frame DF2, the ID combination of the output source hardware ID and the data ID includes (2,1), (2,2), and (2,3).

In the third data frame DF3, the ID combinations of the output source hardware ID and the data ID includes (3,1), (3,2), (3,3), and (3,4).

An example of the correspondence relationship among one output source hardware ID, one data ID, and one distribution destination hardware ID is "(1,1)→1". "(1,1)→1" indicates that data having the output source hardware ID of 1 and the data ID of 1 is output to the SDRAM 111.

An example of the correspondence relationship among multiple output source hardware IDs, multiple data IDs, and one distribution destination hardware ID is "(1,1)+(2,2)→3". "(1,1)+(2,2)→3" indicates that a combination of data having the output source hardware ID of 1 and the data ID of 1 and data having the output source hardware ID of 2 and the data ID of 2 is output to the communication device 113.

An example of the correspondence relationship among one output source hardware ID, one data ID, and multiple distribution destination hardware IDs is "(2,2) →2,3". "(2, 2)→2,3" indicates that data having the output source hardware ID of 2 and the data ID of 2 is output to the flash memory 112 and the communication device 113.

An example of the correspondence relationship among multiple output source hardware IDs, multiple data IDs, and multiple distribution destination hardware IDs is "(2,1)+(3, 4)→1, 2". "(2,1)+(3,4)→1, 2" indicates that a combination of data having the output source hardware ID of 2 and the data ID of 1 and data having the output source hardware ID of 3 and the data ID of 4 is output to the SDRAM 111 and the flash memory 112.

In the distribution destination setting table 25, a data output priority is set for each ID combination of one output source hardware ID and one data ID. For example, priorities are set for all of the ID combination of the output source hardware IDs and the data IDs. All of the ID combination of the output source hardware IDs and the data IDs include (1,1), (1,2), (2,1), (2,2), (2,3), (3,1), (3,2), (3,3), and (3,4).

The distribution destination determination circuit 26 determines the distribution destination of the first data frame DF1 based on (i) the output source hardware ID and the data ID of the first data frame DF1 input from the first hardware 101 and (ii) the distribution destination setting table 25. The distribution destination determination circuit 26 determines the distribution destination of the second data frame DF2 based on (i) the output source hardware ID and the data ID of the second data frame DF2 input from the second hardware 102 and (ii) the distribution destination setting table 25. The distribution destination determination circuit 26 determines the distribution destination of the third data frame DF3 based on (i) the output source hardware ID and the data ID of the third data frame DF1 input from the third hardware 103 and (ii) the distribution destination setting table 25.

The data distribution circuit 27 outputs the first, second, and third data frames DF1, DF2, and DF3, which are input from the first, second, and third hardware 101, 102, and 103, to the respective distribution destinations determined by the distribution destination determination circuit 26.

The following will describe a process executed by the distribution circuit 14.

Figure 3:
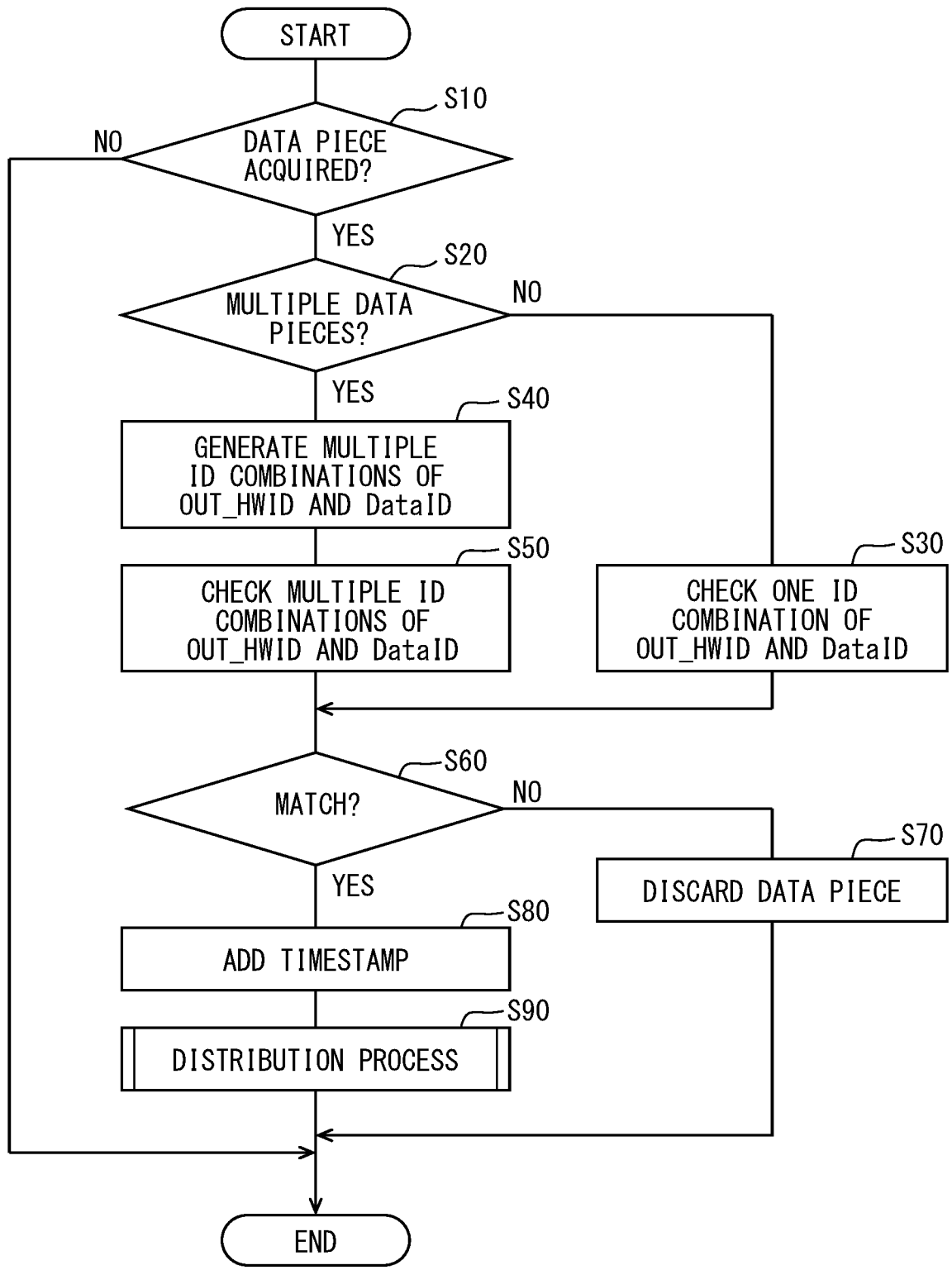
FIG. 3 is a flowchart showing a process executed by a distribution circuit.

As illustrated in FIG. 3, in S10, the distribution circuit 14 determines whether a new data frame is acquired from the first, second, or third hardware 101,102, 103. When a new data frame has not been acquired, the distribution circuit 14 ends the process. When a new data frame is acquired, in S20, the distribution circuit 14 determines whether multiple data frames are newly acquired.

When the number of newly acquired data frames is one, in S30, the distribution circuit 14 checks the output source hardware ID and the data ID of the acquired one data frame, and proceeds to S60. The distribution circuit 14 determines whether the ID combination of the output source hardware ID and the data ID of the acquired one data frame is included in the distribution destination setting table 25. When the ID combination of the output source hardware ID and the data ID is included in the distribution destination setting table 25, the distribution circuit 14 extracts the corresponding distribution destination hardware ID from the distribution destination setting table 25 and determines the extracted destination as the distribution destination of the acquired data frame.

When the number of newly acquired data frames is two or more, that is, multiple, in S40, the distribution circuit 14 generates ID combination of the output source hardware ID and the data ID of the multiple newly acquired data frames. An example of the ID combination of the output source hardware ID and the data ID of the multiple data frames is "(2,1)+(3,4)" as described above.

In S50, the distribution circuit 14 checks the ID combination of the output source hardware IDs and the data IDs of the multiple data frames, and proceeds to S60. Specifically, the distribution circuit 14 determines whether the ID combination of the output source hardware IDs and the data IDs of the acquired multiple data frames are included in the distribution destination setting table 25. When the ID combination of the output source hardware IDs and the data IDs are included in the distribution destination setting table 25, the distribution circuit 14 extracts the corresponding distribution destination hardware IDs from the distribution destination setting table 25 and determines the extracted destinations as the distribution destinations of the acquired data frames. For example, when the ID combination of the output source hardware IDs and the data IDs of the acquired data frames is "(2,1)+(3,4)" and the distribution destination setting table 25 includes "(2,1)+(3,4)→1, 2", "1, 2" is extracted as the distribution destination hardware IDs. As a result, the SDRAM 111 and the flash memory 112 are determined as the distribution destinations of the acquired data frames.

In S60, the distribution circuit 14 determines whether the ID combination of the output source hardware IDs and the data IDs of one or more data frames matches the ID combination of the output source hardware IDs and the data IDs included in the distribution destination setting table 25 based on a check result in S30 or S50. When the ID combination of the output source hardware IDs and the data IDs of one or more data frames matches the ID combination of the output source hardware IDs and the data IDs included in the distribution destination setting table 25, the distribution circuit 14 proceeds to S80. When matching is failed, the distribution circuit 14 discards the newly acquired data frame in S70, and ends the process.

In S80, the distribution circuit 14 adds a time stamp indicating the current date and time to the newly acquired data frame. Then, in S90, the distribution circuit 14 executes distribution process to be described later, and ends the process. The distribution circuit 14 repeatedly executes the processes including S10 to S90 during in an operation state of the distribution circuit 14.

Figure 4:
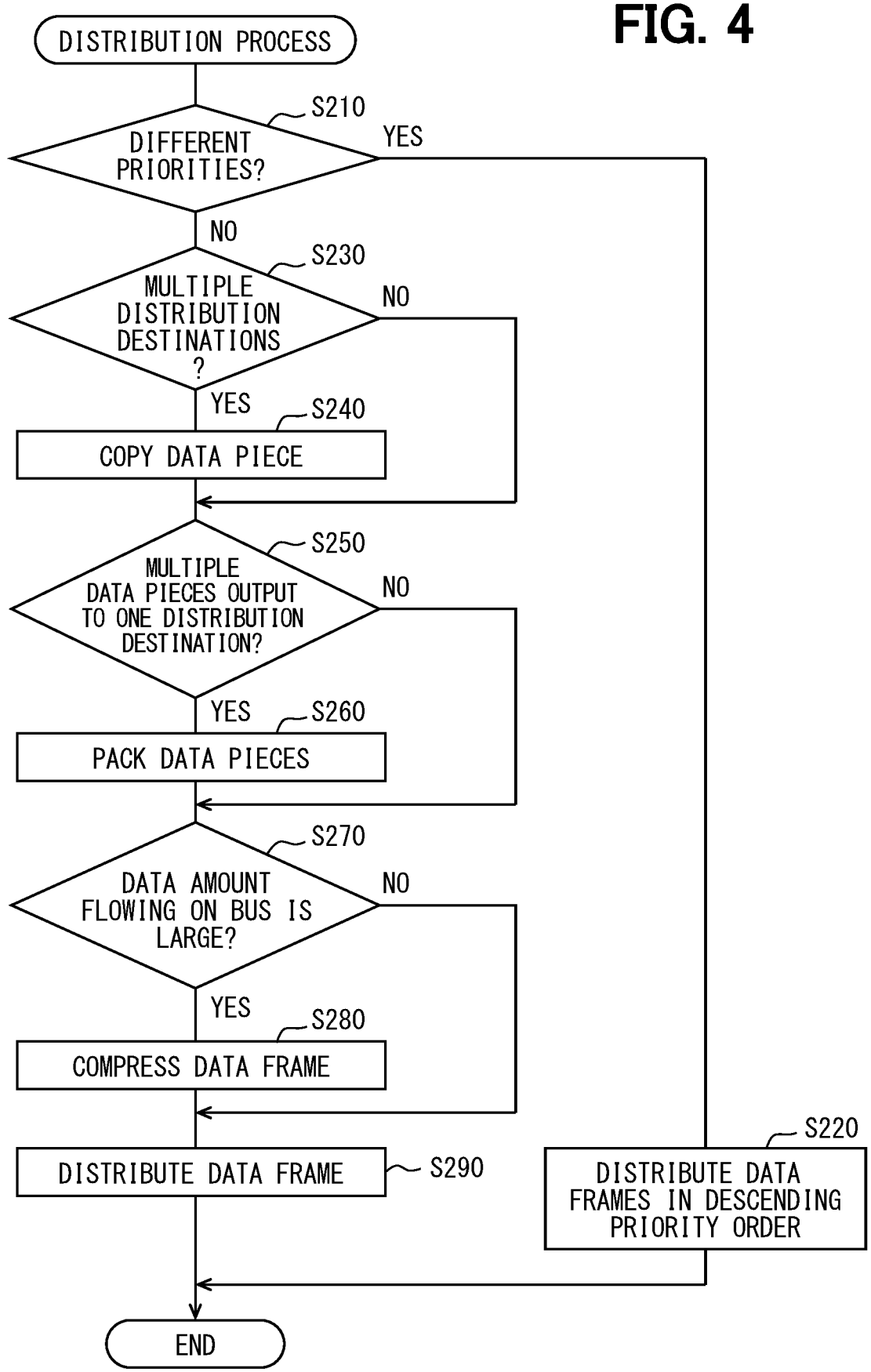
FIG. 4 is a flowchart showing a distribution process.

The following will describe details of the distribution process executed in S90 with reference to FIG. 4.

In the distribution process, as shown in FIG. 4, in S210, the distribution circuit 14 determines whether the multiple data frames newly acquired in S10 have different priorities from one another based on the distribution destination setting table 25. When the number of data frames newly acquired in S10 is one, the distribution circuit 14 determines that the priorities are not different in S210.

When the priorities of acquired data frames are determined to be different from one another, in S220, the distribution circuit 14 outputs each of the data frames acquired in S10 to the distribution destination determined in S50 in descending order of priority, and ends the distribution process.

When the priorities of acquired data frames are determined to be not different, the distribution circuit 14 determines, in S230, whether multiple distribution destinations are determined in S30 or S50.

In S230, in response to determining that the distribution destination is one, the distribution circuit 14 proceeds to S250. In S230, when multiple distribution destinations are determined, the distribution circuit 14 proceeds to S240 and copies one or more data frames newly acquired in S10 by the number of distribution destinations determined in S30 or S50. Then, the distribution circuit 14 proceeds to S250.

In S250, the distribution circuit 14 determines whether to output multiple data frames to one distribution destination. In S250, in response to determining outputting one data frame to one distribution destination (S250: NO), the distribution circuit 14 proceeds to S270.

In S250, when the distribution circuit 14 determines that multiple data frames are output to one distribution destination, the distribution circuit 14 packs the multiple data frames in S260, and proceeds to S270.

When S240 is not executed, the distribution circuit 14 generates, in S260, one data frame including the output source hardware IDs, the data IDs, and the data of the multiple data frames newly acquired in S10. Specifically, the distribution circuit 14 stores the output source hardware IDs of the acquired data frames in the hardware ID field F1 of the newly generated data frame. The distribution circuit 14 stores the data IDs of the acquired data frames in the data ID field F2 of the newly generated data frame. The distribution circuit 14 stores the data (multiple data piece) of the acquired data frames in the data field F3 of the newly generated data frame.

When S240 is executed, the distribution circuit 14 generates, in S260, one data frame including the output source hardware IDs, the data IDs, and the data of the multiple data frames for each distribution destination by using the data frames copied by the number of distribution destinations.

In S270, the distribution circuit 14 determines whether the amount of data flowing through the bus 15 is large. Specifically, the distribution circuit 14 measures the amount of data flowing on the bus 15 per unit time. The distribution circuit determines that the amount of data flowing on the bus 15 is large when the measured amount of data is equal to or larger than a preset compression determination value.

When the amount of data flowing on the bus 15 is not large, the distribution circuit 14 proceeds to S290. When the amount of data flowing on the bus 15 is large, the distribution circuit 14 compresses the data frame to be output to the distribution destination in S280, and proceeds to S290.

In S290, the distribution circuit 14 outputs one or more data frames newly acquired in S10 or one or more data frames generated by the processing of S230 to S280 to the distribution destination determined in S30 or S50. Then, the distribution process is ended. The time stamp is added to the data frame to be output to the distribution destination by the process of S80.

The data distribution device 1 configured as described above includes the data storage 12, the distribution destination determination circuit 26, and the data distribution circuit 27. The distribution destination determination circuit 26 and the data distribution circuit 27 are configured by digital circuits including multiple logic circuits.

The data storage 12 is stores the distribution destination setting table 25. The distribution destination setting table 25 sets the correspondence relationship between an ID combination and a distribution destination hardware ID. The ID combination is a combination of an output source hardware ID and a data ID. The output source hardware ID indicates hardware corresponding to an output source of acquired data. The data ID indicates a type of the acquired data. The distribution destination hardware ID indicates hardware corresponding to a distribution destination of the acquired data.

The distribution destination determination circuit 26 is configured to determine the distribution destination of the acquired data based on (i) the combination of the output source hardware ID and the data ID, which are included in the acquired data, and (ii) the distribution destination setting table 25.

The data distribution circuit 27 is configured to output the acquired data to the hardware corresponding to the distribution destination (hereinafter referred to as distribution destination hardware device) determined by the distribution destination determination circuit 26.

The data distribution device 1 having the above-described configuration can distribute data without using software. That is, the data distribution device 1 distributes data by using the distribution destination determination circuit 26 and the data distribution circuit 27, which are implemented by digital circuits including multiple logic circuits. In the data distribution device 1, the distribution destination determination circuit 26 and the data distribution circuit 27 are provided with the data acquisition function of acquiring data to be used in installation of new software. Thus, it is possible to suppress decrease in the processing speed of the existing software or occurrence of malfunction due to a change made in the existing software.

The distribution destination setting table 25 sets a correspondence relationship between multiple ID combinations and distribution destination hardware IDs. The distribution destination determination circuit 26 is configured to determine the distribution destination device of the multiple acquired data frames based on the multiple ID combinations corresponding to the multiple acquired data frames and the distribution destination setting table 25. By using the distribution destination setting table 25, the data distribution device 1 can easily determine the distribution destination hardware device when simultaneously distributing multiple acquired data frames.

The data distribution circuit 27 is configured to measure the amount of data flowing on the bus 15 through which the acquired data is transmitted to the distribution destination hardware device. When a preset data compression condition indicating large data amount on the bus is satisfied, the data distribution circuit compresses the acquired data and then outputs the compressed acquired data to the distribution destination hardware device. The data compression condition of the present embodiment is satisfied when the measured data amount is equal to or larger than a preset compression determination value. Accordingly, the data distribution device 1 can suppress the occurrence data output failure, in which the acquired data cannot be output due to large amount of data flowing on the bus 15.

The data distribution circuit 27 is configured to copy the acquired data by the number of distribution destination hardware devices when outputting the acquired data to multiple distribution destination hardware devices. Thus, the data distribution device 1 can add necessary information to each copy of the acquired data thereby generating multiple pieces of data to be distributed to multiple distribution destination hardware devices.

When outputting multiple pieces of acquired data to one distribution destination hardware device, the data distribution circuit 27 is configured to pack the multiple pieces of acquired data and output the packed data to one distribution destination hardware device. As a result, when the data distribution device 1 executes the output process of outputting multiple pieces of acquired data, the data distribution device 1 does not need to execute multiple times of output execution corresponding to the number of pieces of acquired data and can output the acquired data in one-time execution. Therefore, it is possible to reduce a processing load for executing the output process.

The distribution destination setting table 25 sets a priority for each of the multiple ID combinations. When outputting multiple pieces of acquired data, the data distribution circuit 27 is configured to output the acquired data in descending order of priority. Thus, the data distribution device 1 can set the output order according to the ID combination of the acquired data.

When outputting the acquired data, a time stamp is added to the acquired data and then output to the distribution destination hardware device. Thus, the data distribution device 1 can provide the distribution destination hardware device with information indicating the time at which the acquired data is distributed.

The distribution destination setting table 25 stored in the data storage 12 is updated after the data distribution device 1 is powered on. Thus, the data distribution device 1 can change the contents of the distribution destination setting table 25 as necessary.

In the present embodiment, each of the first, second, and third data frames DF1, DF2, and DF3 corresponds to acquired data piece, the ID combination corresponds to an identification information combination, and the bus 15 corresponds to an output path.

Although embodiments of the present disclosure have been described above, the present disclosure is not limited to the above embodiments, and various modifications can be made to implement the present disclosure.

First Modification

In the above embodiment, the first, second, and third hardware 101, 102, and 103 are connected to the data distribution device 1 as output source hardware devices. The number of output source hardware devices may be one, two, four or more than four.

Second Modification

In the above embodiment, the SDRAM 111, the flash memory 112, and the communication device 113 are connected to the data distribution device 1 as the distribution destination hardware device. The number of distribution destination hardware devices may be two, four or more than four.

Third Modification

In the above embodiment, the priority of data output is set for each ID combination. As another example, the priority may be set for each distribution destination hardware device, that is, the SDRAM 111, the flash memory 112, and the communication device 113 in the example described in the above embodiment.

Fourth Modification

In the above embodiment, the correspondence relationship between multiple ID combinations and distribution destination hardware IDs is set. In another example, multiple ID combinations may be converted into a single ID. For example, when "(2, 1)+(3,4)→1, 2" is set in the distribution destination setting table 25 as the correspondence relationship between the multiple ID combinations and the distribution destination hardware IDs, "(2,1)+(3,4)" may be converted into "101". In this case, it is necessary to change "(2,1)+(3,4)→1, 2" to "101→1, 2" in the distribution destination setting table 25.

In the embodiments described above, multiple functions of one component may be implemented by multiple components, or one function of one component may be implemented by multiple components. Also, multiple functions of multiple components may be implemented by one component, or one function implemented by multiple components may be implemented by one component. It may also be possible to omit partial configuration in each embodiment described above. Alternatively, it may also be possible to add or substitute at least a part of the configuration in each embodiment described above to or in a configuration in another embodiment described above.

What is claimed is:

1. A data distribution device comprising:
a data storage storing a distribution destination setting table that defines a correspondence relationship between (i) an identification information combination and (ii) distribution destination hardware identification information, the identification information combination being a combination of output source hardware identification information, which indicates a hardware device corresponding to an output source of acquired data piece, and data identification information, which indicates a type of the acquired data piece, the distribution destination hardware identification information indicating a hardware device corresponding to a distribution destination of the acquired data piece;
a distribution destination determination circuit determining the distribution destination of the acquired data piece based on (i) the combination of the output source hardware identification information and the data identification information, which are included in the acquired data piece, and (ii) the distribution destination setting table; and
a data distribution circuit outputting the acquired data piece to a distribution destination hardware device, which is a hardware device corresponding to the distribution destination determined by the distribution destination determination circuit,
wherein the distribution destination determination circuit and the data distribution circuit are implemented by digital circuits that include multiple logic circuits.

2. The data distribution device according to claim 1, wherein
the distribution destination setting table further defines a correspondence relationship between a plurality of the identification information combinations and the distribution destination hardware identification information, and
the distribution destination determination circuit determines distribution destinations of a plurality of the acquired data pieces based on (i) the plurality of identification information combinations corresponding to the plurality of acquired data pieces and (ii) the distribution destination setting table.

3. The data distribution device according to claim 1, wherein
the data distribution circuit measures an amount of data flowing on an output path, through which the acquired data piece is transmitted to the distribution destination hardware device, and
the data distribution circuit compresses the acquired data piece and then outputs the compressed acquired data piece to the distribution destination hardware device in response to a satisfaction of a preset data compression condition, which indicates a large amount of data flowing on the output path.

4. The data distribution device according to claim 1, wherein,
when the data distribution circuit distributes the acquired data piece to a plurality of the distribution destination hardware devices, the data distribution circuit copies the acquired data piece by a quantity of the plurality of the distribution destination hardware devices.

5. The data distribution device according to claim 1, wherein,
when the data distribution circuit distributes a plurality of the acquired data pieces to the distribution destination hardware device, the data distribution circuit packs the plurality of the acquired data pieces into one data piece and then outputs the packed one data piece to the distribution destination hardware device.

6. The data distribution device according to claim 1, wherein
the distribution destination setting table includes a plurality of the identification information combinations and defines a priority for each of the plurality of the identification information combinations, and
the data distribution circuit outputs the acquired data piece in descending order of the priorities of the plurality of the identification information combinations.

7. The data distribution device according to claim 1, wherein
a time stamp is added to the acquired data piece when the acquired data piece is output to the distribution destination hardware device.

8. The data distribution device according to claim 1, wherein
the distribution destination setting table stored in the data storage is updated after the data distribution device is powered on.

* * * * *